(12) United States Patent
Baum

(10) Patent No.: US 7,440,509 B2
(45) Date of Patent: Oct. 21, 2008

(54) METHOD AND SYSTEM FOR INTERFERENCE AVERAGING IN A WIRELESS COMMUNICATION SYSTEM

(75) Inventor: Kevin Lynn Baum, Rolling Meadows, IL (US)

(73) Assignee: Motorola, Inc., Schaumburg, IL (US)

( * ) Notice: Subject to any disclaimer, the term of this patent is extended or adjusted under 35 U.S.C. 154(b) by 247 days.

(21) Appl. No.: 11/338,564

(22) Filed: Jan. 24, 2006

(65) Prior Publication Data

US 2006/0120473 A1    Jun. 8, 2006

Related U.S. Application Data

(62) Division of application No. 09/886,628, filed on Jun. 21, 2001, now abandoned.

(51) Int. Cl.
*H04K 1/10* (2006.01)
(52) U.S. Cl. .................................... 375/260
(58) Field of Classification Search ............. 375/260, 375/267, 278, 284, 285, 296, 299
See application file for complete search history.

(56) References Cited

U.S. PATENT DOCUMENTS

2002/0154705 A1* 10/2002 Walton et al. ............... 375/267

OTHER PUBLICATIONS

Wong et al. Multiuser OFDM with Adaptive Subcarrier, Bit and Power Allocation, IEEE, vol. 17, No. 10, Oct. 1999, p. 1747-1757.*

* cited by examiner

*Primary Examiner*—Sam K Ahn

(57) ABSTRACT

A family of methods for interference averaging in multicarrier systems, such as orthogonal frequency division multiplexing (OFDM) systems. The methods can provide interference averaging in situations where an interfering co-channel is either partially or fully loaded. For partially loaded systems, subcarrier puncturing, frequency domain repetition, time domain repetition, and hybrid time-frequency repetition schemes are provided. For systems using adaptive modulation/coding rates, lower rates and transmit power can be selected in order to perform interference averaging in time-spread and frequency-spread OFDM schemes. In systems with downlink power control, frequency domain mixing can be used to perform interference averaging.

22 Claims, 7 Drawing Sheets

STANDARD TRANSMISSION SCHEME

FREQUENCY DOMAIN MIXING OF USERS WITH DIFFERENT POWER LEVELS

METHOD AND SYSTEM FOR INTERFERENCE AVERAGING IN A WIRELESS COMMUNICATION SYSTEM

RELATED APPLICATION DATA

This application claims the benefit as a divisional application of U.S. patent application Ser. No. 09/886,628 entitled "METHOD AND SYSTEM FOR INTERFERENCE AVERAGING IN A WIRELESS COMMUNICATION SYSTEM" and filed Jun. 21, 2001 now abandoned.

TECHNICAL FIELD OF THE INVENTION

The present invention relates generally to wireless communication systems, and in particular, to a method and system of interference averaging that can reduce the effects of co-channel interference.

BACKGROUND OF THE INVENTION

Several techniques are used in cellular systems to improve robustness to co-channel interference. In fractionally loaded systems, interference avoidance and interference averaging are two of the known techniques for improving system performance. With ideal interference avoidance, transmissions in the cell-of-interest are scheduled for time periods when other co-channel cells are not transmitting so that interference is avoided. In theory, interference avoidance can provide a higher total system capacity than interference averaging. However, interference avoidance requires system-level coordination of transmission schedules among the different cells.

In contrast to interference avoidance, interference averaging does not normally require any coordination among different cells. The goal of interference averaging is to make the performance impact of time-varying or bursty interference similar to that of a lower-power continuous interferer. A known method for interference averaging is burst mode transmission combined with coding and time interleaving. In this method, the data to be transmitted is first encoded using a forward error correction (FEC) code; it is then interleaved and transmitted over multiple time slots, where a large separation between the multiple slots is preferred. In addition, the transmitter is configured to turn off during any time periods where no data is scheduled for transmission. A known improvement to this method is to add frequency hopping, where the radio frequency (RF) carrier of the transmission is changed on a burst-by-burst or frame-by-frame basis.

For packet-oriented orthogonal frequency division multiplexing (OFDM) systems, the above-described method of interference averaging has room for improvement. This is primarily because the time duration of an OFDM symbol is much greater than that of a single carrier system (for the same occupied bandwidth). Because of the long symbol duration, time interleaving over several slots can produce an unacceptable delay, especially for packet data systems.

Another known method for interference averaging is direct sequence code division multiple access (DS-CDMA). With this method, transmissions are continuous in time and the spreading codes of the desired and interfering signals are uncorrelated. As a result, the interference at the output of the DS-CDMA despreader has the appearance of Gaussian noise of virtually constant average power. However, conventional DS-CDMA is not directly applicable to OFDM systems since the spreading process creates interference between the subcarriers in a multipath OFDM channel.

Thus, there is a need for improved an OFDM interference averaging technique that can achieve interference averaging without creating long delay periods and additional interference between subcarriers in a multipath channel.

DETAILED DESCRIPTION OF THE PRESENTLY PREFERRED EMBODIMENT(S)

The invention provides an improved method and system for interference averaging in an OFDM system that overcomes some of the limitations of the prior art described above. Among other things, the present invention permits interference averaging with reduced delay and time-interleaving. The invention is also applicable to other types of multicarrier communication systems, other than OFDM systems.

Figure 1:
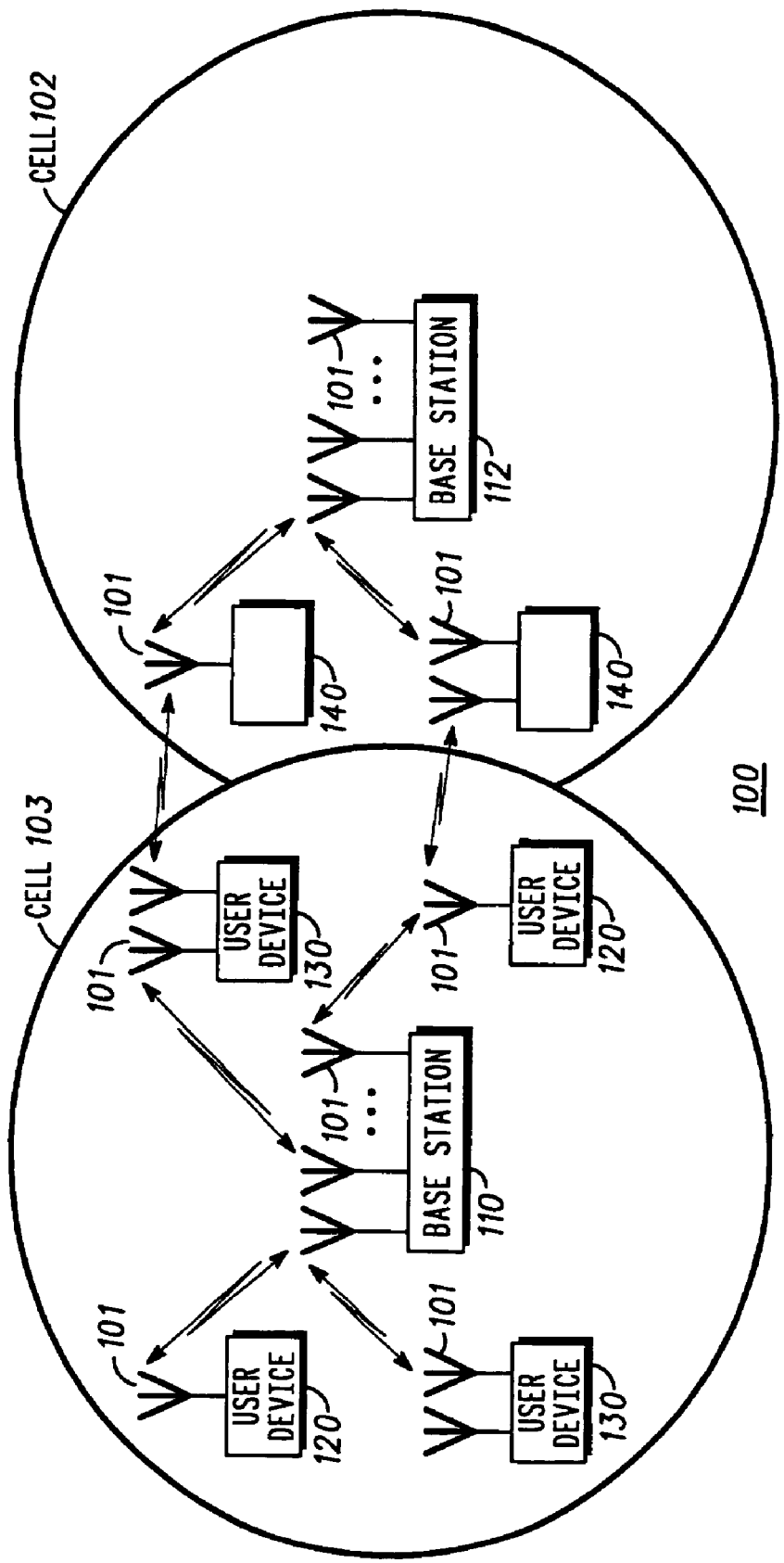
FIG. 1 is an overview diagram of an exemplary wireless (cellular) communication system.

Turning now to the drawings, and in particular to FIG. 1, there is illustrated a wireless communication system 100 that is affected by interfering sources. The system 100 includes a base station 110, which provides communication service to a geographic region known as a cell 103. One or more user devices 120 and 130 communicate with the base station 110. In the example shown, external interference sources 140 share the same spectrum allocated to the base station 110 and subscriber devices 120-130. The external interference sources 140 represent an unwanted source of emissions that interferes with the communication process between the base station 110 and the user devices 120-130. The exact nature and number of the external interference sources 140 depends on the specific arrangement of the wireless communication system 100. In the example of FIG. 1, an external interference source can be a transmitting device, such as another base station and/or user device 140, that is communicating with another user device or base station 112, respectively, in the same frequency spectrum allocated to base station 110 and user devices 120-130.

As shown in FIG. 1, user devices 120 have a single transmit antenna 101, while user devices 130 have more than one antenna 101. The user devices 120-130, as well as the base station 110 may transmit, receive, or both from the at least one antenna 101. An example of this would be a cellular telephone. Additionally, user devices as well as base stations may be referred to as transmitting units, receiving units, transmitters, receivers, transceivers, or any like term.

According to one aspect of the invention, a family of interference averaging techniques is provided to limit the interfering effect of the one or more interfering sources. The base stations 110, 112, user devices 120-130, and sources can be variously configured to employ one or a combination of the techniques disclosed herein to limit the impact of the interference that is generated when they transmit. For example, if the base station in cell 102 utilizes the interference averaging techniques disclosed herein, the impact of the interference propagating from the base station in cell 102 into cell 103 can be reduced. Likewise, when the base station in cell 103 utilizes the interference averaging techniques disclosed herein, the impact of the interference propagating from the base station in cell 103 into cell 102 can be reduced.

Interference Averaging Techniques for Fractionally Loaded Systems

Interference averaging can provide benefit when systems are partially (fractionally) loaded. "Partially loaded" means that the amount of data that must be transmitted in a particular time interval is less than the total data carrying capacity of the system. Consider an example where a co-channel interfering cell has a 50% load. If the interfering cell transmits at full power for 50% of the time, and turns off for the remaining time, then the interference will be either "on" at full power or "off" (zero power). This creates extreme variations in the interference. The goal of interference averaging is to make the interferer appear to be "on" all of the time, but at a power level that is, in this example, 50% less than the full-power value. Therefore, the motivations behind the techniques described herein are to satisfy the following objectives: 1) make a received interfering OFDM signal transmission appear semi-continuous in both the time and frequency domains, and 2) reduce the apparent OFDM signal transmit power when the system in partially loaded (i.e., make the apparent transmit power proportional to the system load).

In the following examples of the invention, it is assumed that the OFDM system transmits on N subcarriers and the system load is less than 100% in all cells of the system. For convenience and ease of explanation, an L=0.5 (50%) loading condition is assumed, and the transmitter will use two OFDM symbol periods (instead of one) for the transmission of every N data symbols. Generally, the transmitted information can be spread over 1/L symbol periods to take full advantage of interference averaging. The techniques described herein can also be applied over a larger number of OFDM symbol periods in order to take advantage of channel variations over time.

The data symbols can represent uncoded or coded information bits. For example, uncoded QPSK data symbols represent two information bits per symbol. In another example, information bits can be coded with a forward-error-correction (FEC) code prior to being mapped onto data symbols. If a rate ¾, or R=¾, convolutional code is used together with QPSK modulation, then each QPSK data symbol will represent 1.5 information bits. Interleaving can also be applied to the coded information bits before they are mapped onto the data symbols. In another example, trellis-coded modulation can be used in place of separate coding and modulation.

Subcarrier Puncturing

Figure 2:
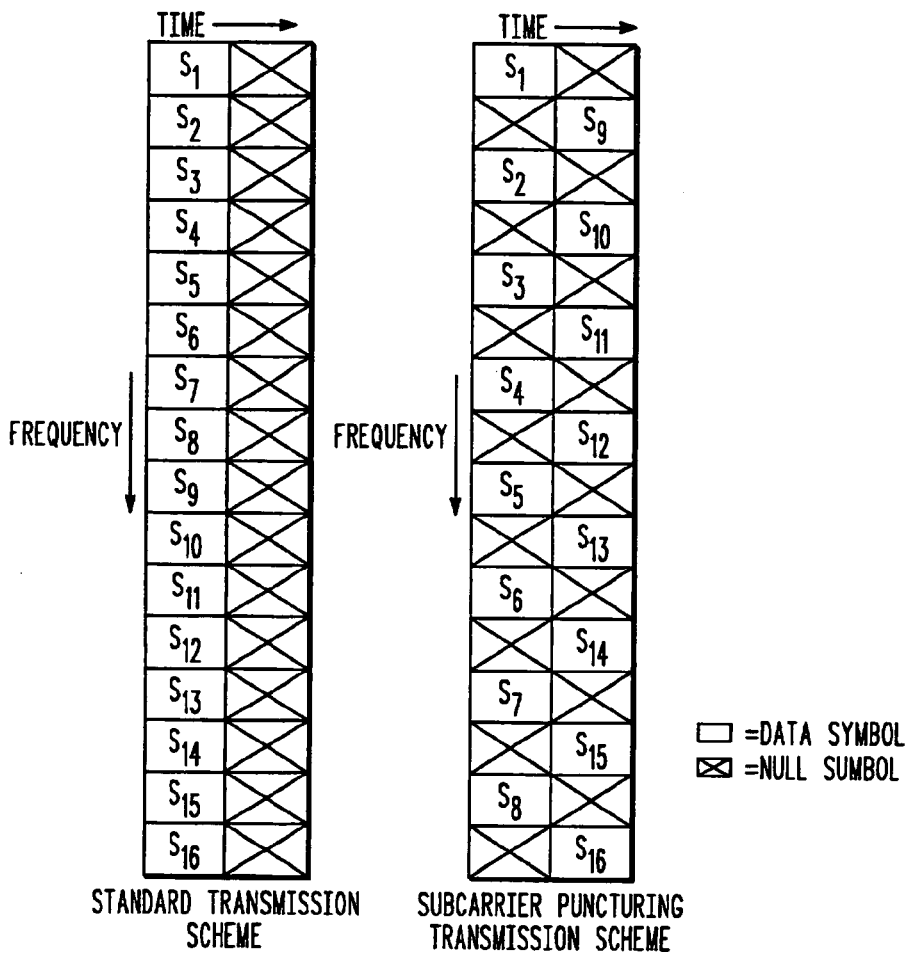
FIG. 2 is a time-frequency diagram illustrating the transmission of symbols using a prior art OFDM transmission scheme and a punctured transmission scheme in accordance with the present invention.

The first inventive method of interference averaging utilizes subcarrier puncturing. Sub carrier puncturing involves transmitting zeros (nulls) on selected subcarriers. Since a null subcarrier does not contribute to the transmitted signal power, the total signal power over a symbol period is reduced by the presence of the null subcarriers. For the exemplary 50% loading/two OFDM symbol transmission assumption, half of the N subcarriers would contain data symbols and the other half would contain zeros. This would reduce the transmitted signal power over an OFDM symbol period by 50%. An example of the difference between a conventional OFDM transmission scheme and the subcarrier puncturing method of the invention is shown in FIG. 2. In FIG. 2, the conventional scheme is depicted on the left side of the drawing, while the scheme provided by the present invention is depicted on the right side of the drawing. With the conventional scheme, N=16 symbols are transmitted in one OFDM symbol period, while the puncturing scheme transmits eight data symbols in each of two OFDM symbol periods. In this example, two adjacent OFDM symbol periods are used to transmit the 16 data symbols. Although shown as being adjacent in time, the transmissions are not required to be adjacent in time.

An aspect of this method is the placement of the null subcarriers. Two exemplary approaches for placement are even spacing and pseudo-random placement.

To space evenly, the null subcarriers are placed evenly across the band (e.g., every other subcarrier), using the same positions in all cells of the system. This approach is not desirable if the interference is time and frequency synchronous with the desired signal because the interference power will not be reduced on the data-bearing subcarriers of the desired signal. In order to spread the interference power across all the subcarriers, the orthogonality of the interfering subcarriers must be broken down. The preferred methods disclosed here for reducing the orthogonality of the interfering subcarriers include cell-specific time and/or frequency offsets. Time offsets of approximately ½ the OFDM symbol period and frequency offsets of approximately ½ of the subcarrier spacing can be effective for spreading the interference power.

The second approach is to randomize the placement of the null subcarriers across the band in each cell. Optionally, a different pseudo-random mapping for each OFDM symbol period can be used. This approach is effective if several interferers are present with similar power levels. However, if a single interferer is dominant, cell-specific time and/or frequency offsets can be included to help spread the interference power more uniformly over the frequency band. In addition, the placement of the null subcarriers can be changed after every OFDM symbol period.

The use of cell-specific time or frequency offsets can optionally be applied to any of the interference averaging methods disclosed herein. With cell-specific time offsets, the transmitters in one cell offset their time reference relative to the time reference of another cell. With cell-specific frequency offsets, the transmitters in one cell offset the frequencies of the transmitted subcarriers of the multicarrier signal relative to another cell.

In an alternate embodiment, the orthogonality of the interfering subcarriers can be broken down by using different subcarrier spacings in different cells, or by using different symbol period lengths in different cells.

Figure 3:
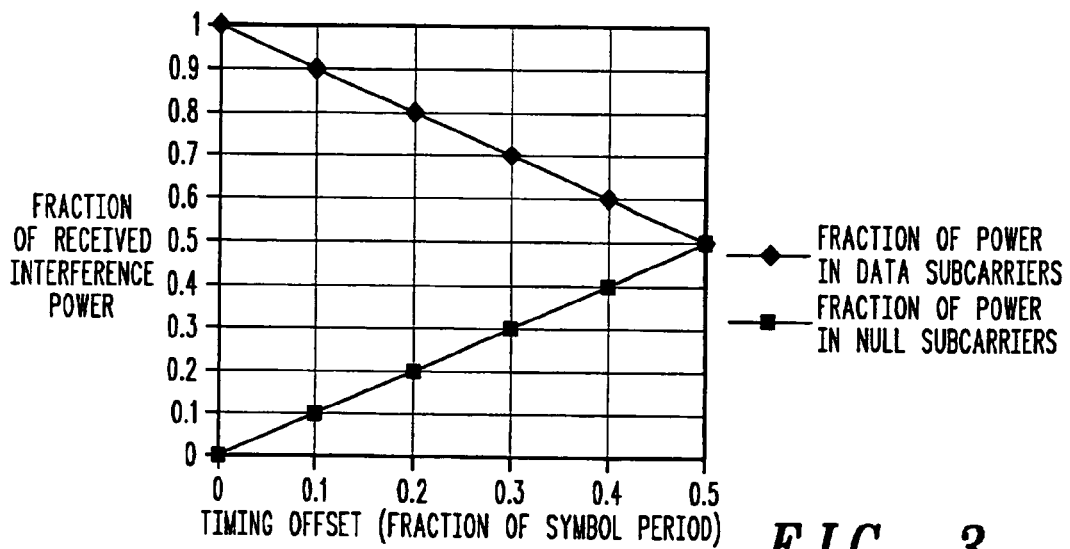
FIG. 3 is a graph illustrating the relative co-channel interference power of an exemplary interference averaging scheme, using subcarrier puncturing and timing offset, in accordance with the invention.
Figure 4:
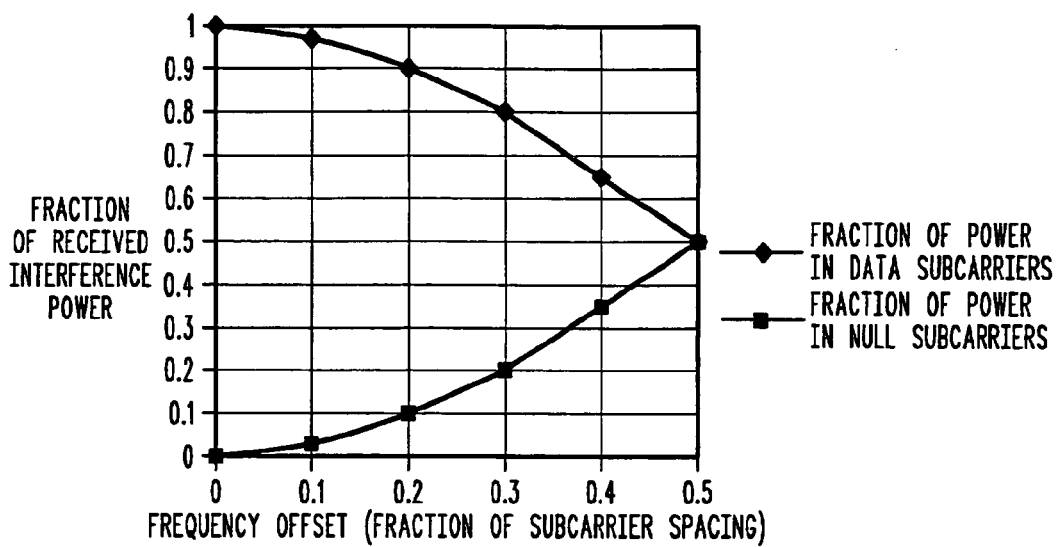
FIG. 4 is a graph illustrating the relative co-channel interference power of an exemplary interference averaging scheme, using subcarrier puncturing and frequency offset, in accordance with the invention.

FIGS. 3-4 are graphs illustrating the relative co-channel interference power of exemplary subcarrier puncturing schemes using time and frequency offsets, respectively. Shown is the performance for a 512 subcarrier OFDM system using the subcarrier puncturing scheme described earlier in the document. The even-numbered subcarriers are modulated with data symbols and the odd-numbered subcarriers are punctured (i.e., modulated with null symbols). The signal is assumed to originate from an interfering (co-channel) cell, so that the received signal is comprised entirely of interference. The "channel" is assumed to be a pure time shift or a pure frequency shift. For the results illustrated in the graphs of FIGS. 3-4, the receiver performs a 512-point fast Fourier transfer (FFT) on the received signal every OFDM symbol period, and monitors the average power on the even and odd subcarriers separately.

FIG. 3 shows the fraction of the received signal power (in this case, the "signal" is actually interference) on the odd and even subcarriers as a function of the time offset. These results show that a time offset produces a redistribution of the interference power into the null subcarriers. The amount of redistribution is proportional to the time offset. For the maximum possible relative time offset 0.5 symbols, the interference power becomes equally distributed between the data and null subcarriers. This provides the maximum possible interference averaging effect, i.e., the 50% load translates into a 50% reduction in interference power on the data subcarriers.

For this example, no cyclic extension is used on the OFDM signal. In practice, a cyclic extension can shift the time axis by an amount equal to the cyclic extension duration (worst case, depending on the channel delay spread and timing recovery algorithm). As a result, the time offset may be increased beyond 0.5 symbol periods to maximize the interference averaging effect (assuming that the symbol period is defined as the original information portion of the cyclically extended OFDM symbol).

FIG. 4 shows the fraction of the received signal (interference) power on the odd and even subcarriers as a function of frequency offset. These results show that a frequency offset distributes some of the interference power into the null subcarriers. The redistribution, in this example, does not occur as rapidly as with a time offset, but the maximum possible interference averaging effect is still obtained with a 0.5 subcarrier frequency offset.

Frequency Domain Repetition

Figure 5:
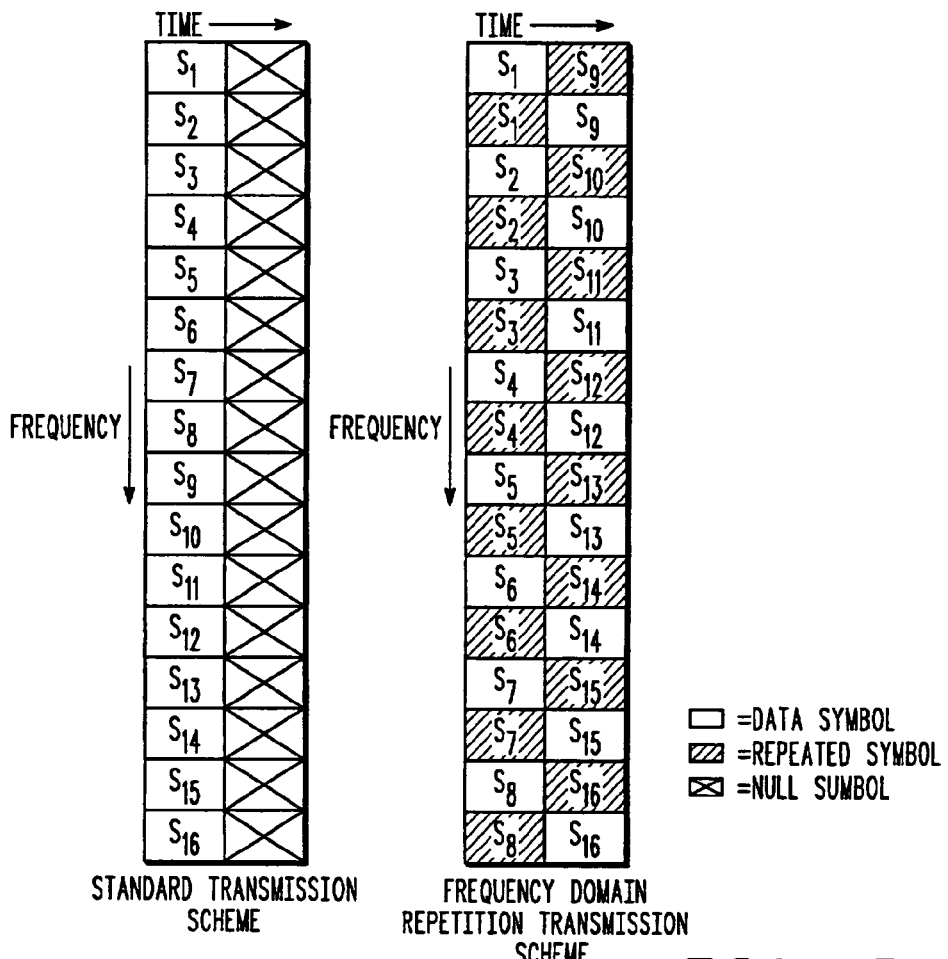
FIG. 5 is a time-frequency diagram illustrating the transmission of symbols using the prior art OFDM transmission scheme and a frequency domain repetition scheme in accordance with the present invention.

Frequency domain repetition involves transmitting the same data symbol on multiple subcarriers. For the assumed system configuration described above, each data symbol would be transmitted on two different subcarriers, and each OFDM symbol period conveys N/2 distinct data symbols. Moreover, the power of each data symbol is reduced by 50% so that the transmitted signal-to-noise ratio $E_b/N_o$ is the same as a system without repetition. As a result, the transmitted signal power over an OFDM symbol period is reduced by 50% but the transmission requires two OFDM symbol periods to transmit N data symbols. FIG. 5 shows an example where each symbol is repeated on an adjacent subcarrier.

Figure 6:
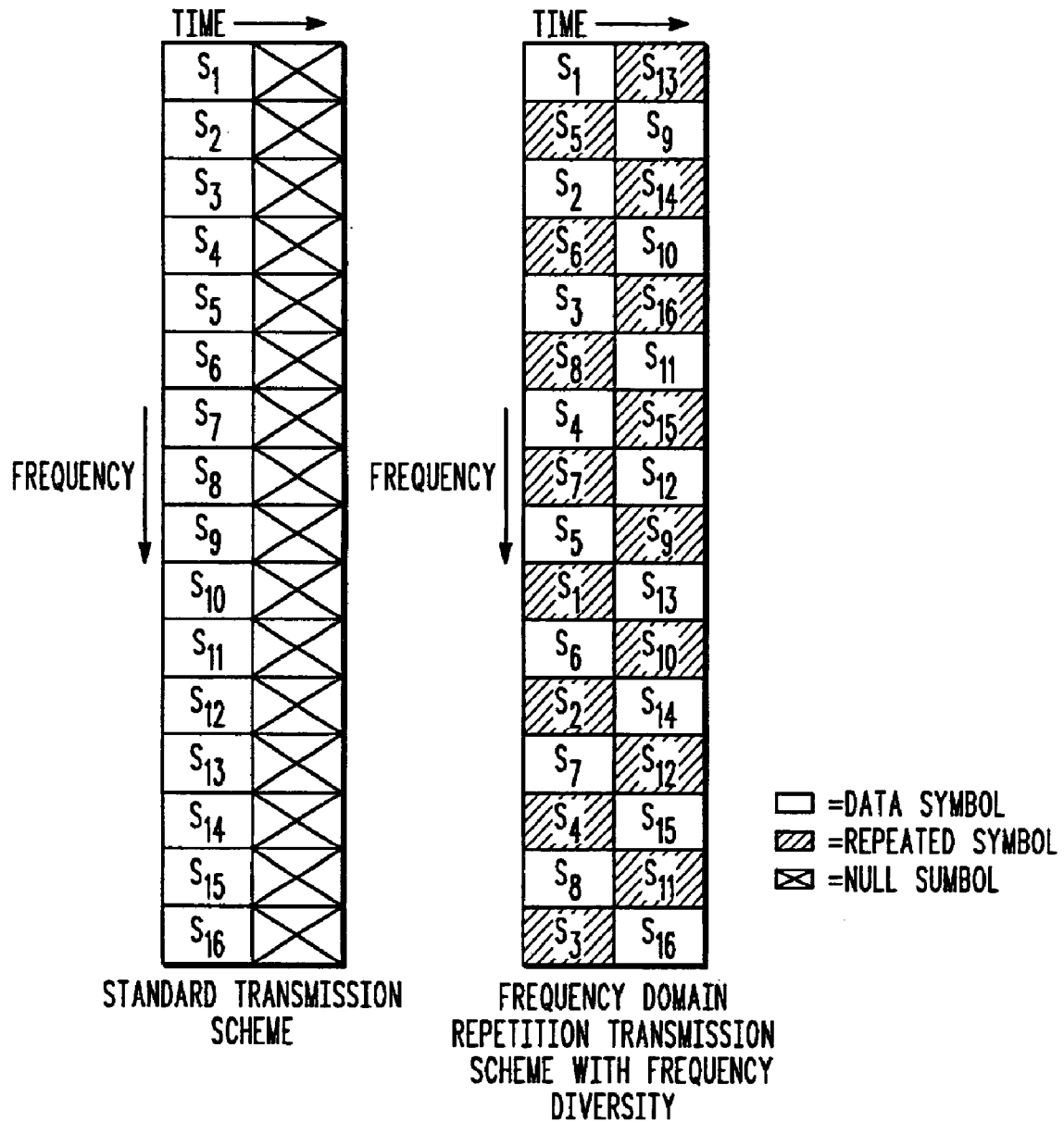
FIG. 6 is a time-frequency diagram illustrating the transmission of symbols using the prior art OFDM transmission scheme and a frequency domain repetition scheme with frequency diversity, in accordance with the present invention.

In general, the repeated symbol does not need to be placed on an adjacent subcarrier. Frequency diversity can be exploited if the elements of the repeated symbol pair are spaced farther apart than the coherence bandwidth of the channel. FIG. 6 shows an example of frequency domain repetition with frequency diversity capability. In order to maximize the interference averaging effect, the symbol repetitions of the interferers should appear to have a different structure than the desired signal. This can be accomplished by using different repetition mappings in different cells, and by rotating the phase of the second symbol of the repeated symbol pair by a different (but predetermined, and optionally time varying) value in each cell. Cell-specific time and frequency offsets can also be added to further randomize the interfering signals.

Some advantages of frequency domain repetition over subcarrier puncturing are: 1) frequency domain repetition can be configured to provide frequency diversity, and 2) a significant interference averaging effect is obtained even without cell-specific time and frequency offsets. However, with frequency domain repetition, granularity is usually limited to integer repetition factors of two or more (and system loads of 50% or less as a result). To improve granularity, different repetition factors can be mixed and used simultaneously to provide more granularity between the standard integer factors.

In a coded system, a method for improving the granularity of this scheme (especially for the case where the system load is between 0.5 and 1) is to modify the forward error correction (FEC) code rate. For example, if a conventional OFDM transmission scheme uses a R=¾ code, an "effective" repetition rate of 1.5 can be provided by changing to a R=½ code. This would be appropriate for an L=⅔ loading condition, and would enable the transmit power to be reduced to approximately ⅔ of the full-load power.

Time Domain Repetition

A third inventive method uses time domain repetition. Time domain repetition involves transmitting the same data symbol over multiple OFDM symbol periods. For the assumed system configuration, each data symbol would be transmitted on two different symbol periods. Moreover, the power of each data symbol can be reduced by 50% so that the transmitted $E_b/N_o$ is the same as a system without repetition. As a result, the transmitted signal power over an OFDM symbol period is reduced by 50% but the transmission requires two OFDM symbol periods to transmit the N data symbols.

Figure 7:
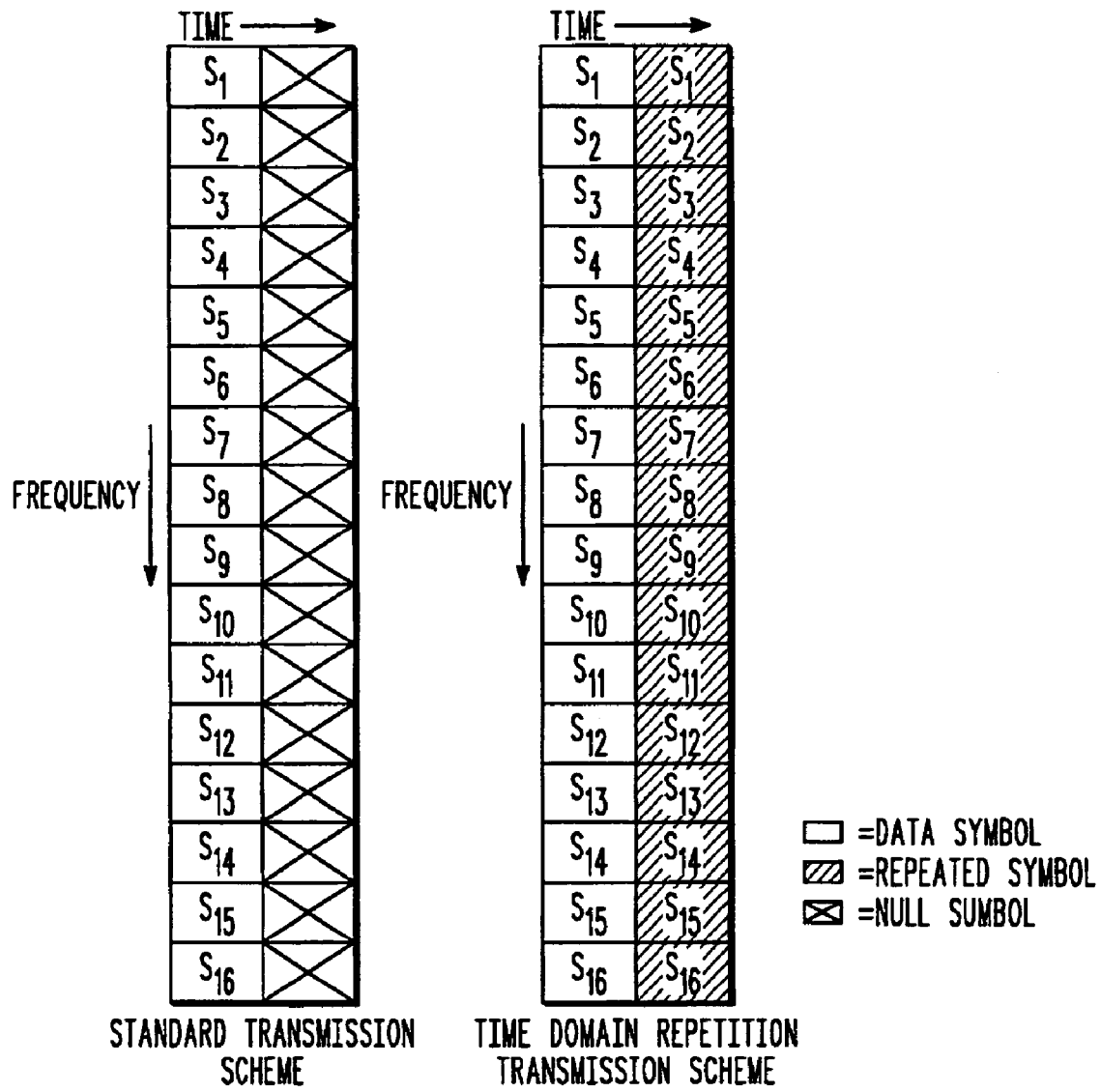
FIG. 7 is a time-frequency diagram illustrating the transmission of symbols using the prior art OFDM transmission scheme and a time domain repetition scheme in accordance with the present invention.

FIG. 7 shows an example where each symbol is repeated in an adjacent OFDM symbol period. Time diversity can also be employed if the elements of the repeated symbol pair are spaced farther apart than the coherence time of the channel.

In order to enhance the interference averaging effect, the symbol repetitions of the interferers can be made to appear to have a different structure than the desired signal. This can be accomplished by using different repetition-time mappings in different cells, and by rotating the phase of the second symbol of the repeated symbol pair by a different value in each cell. Cell-specific time and frequency offsets can also be used to further randomize the interfering signals.

Some advantages of time domain repetition are: 1) time domain repetition can be configured to provide time diversity, and 2) the interference is averaged fairly evenly without cell-specific time and frequency offsets. However, with time domain repetition, granularity is usually limited to integer repetition factors of two or more (and system loads of 50% or less as a result). To improve granularity, different repetition factors can be mixed and used simultaneously to provide more granularity between the standard integer factors. In coded systems, the code rate modification techniques described above in connection with frequency domain repetition can be used to provide more granularity.

Hybrid Time-Frequency Repetition

Figure 8:
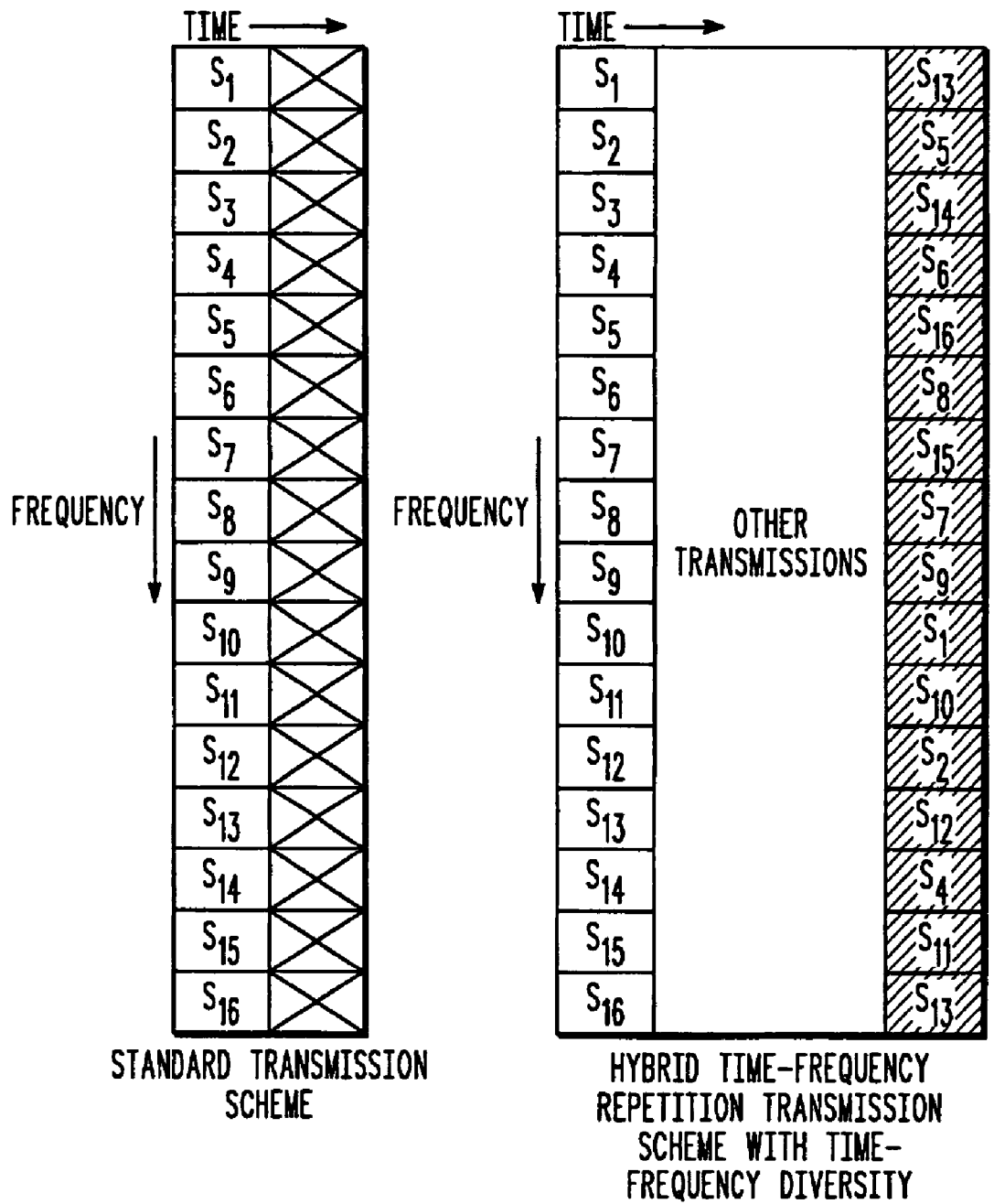
FIG. 8 is a time-frequency diagram illustrating the transmission of symbols using the prior art OFDM transmission scheme and a hybrid time-frequency repetition scheme in accordance with the present invention.

A hybrid time-frequency repetition scheme can also be used, where the repeated symbol is on a different subcarrier and in a different OFDM symbol period. This provides interference averaging and diversity in two dimensions rather than one. FIG. 8 shows an example of the hybrid time-frequency repetition with a relatively large time and frequency spacing to support hybrid time-frequency diversity. If a smaller delay is desired, the repetition can occur in an adjacent symbol interval.

Reduced-Rate Modulation/Coding with Reduced Transmit Power

In systems that use adaptive modulation/coding to adapt to changes in link quality, the selected modulation/coding rate for a particular user is normally the highest rate that can be supported, given the user's received signal quality. If the system is lightly loaded, there may be several idle (unused) time slots, symbol periods, and/or subcarriers in each frame. In this case, the transmission scheme can be modified to provide interference averaging. For example, instead of choosing the highest supportable modulation/coding rate, a lower rate is selected so that more time slots are needed to transmit the same number of information bits. Since a lower modulation/coding rate is used, the required signal to interference plus noise ratio C/(I+N) at the receiver will be reduced accordingly. As a result, the transmit power can be reduced to provide the desired interference averaging effect.

Different modulation/coding rates can be created by pairing a particular modulation scheme with a particular channel coding rate. For example, the modulation scheme can be selected from common formats such as PSK or M-QAM, and the code rates can be selected from common rates such as R=½, R=⅓, and R=¾. The combination of the modulation format and the code rate determines the number of information bits that are represented by each data symbol.

Generally, the transmitted power could be reduced in response to the difference in the required C/(I+N)'s of the different modulation/coding schemes. For example, if only 50% of the time slots were in use with a R=½, 16-QAM modulation scheme, the new transmission concept could use a R=½, QPSK modulation scheme. In this case, the new scheme would use 100% of the time slots, but would reduce the per-symbol-period transmit power. In this case the per-symbol period transmit power can be reduced by 3 dB or more, depending on the performance of the R=½, QPSK modulation scheme. Generally, the transmit power can be reduced by γ dB if the performance of the lower-rate modulation/coding is γ dB superior to original modulation/coding scheme, γ represents a numeric value.

Frequency-Spread OFDM

Frequency-Spread OFDM is a spread-spectrum technique that spreads a data symbol across several or all of the subcarriers of an OFDM system. When combined with multiple access, it is sometimes referred to as OFDM-CDMA or multicarrier CDMA. With Frequency-Spread OFDM, each data symbol modulates a chip vector rather than a single subcarrier. Each element of the chip vector is mapped to a different subcarrier, and the chip vector length is commonly the same as the number of subcarriers in the OFDM system. For an N subcarrier system, N orthogonal chip vectors can be defined, so that N spread data symbols can be transmitted per OFDM symbol period. All of the modulated chip vectors are summed in vector form and the vector sum is used to modulate the OFDM subcarriers. As a result, the spread-spectrum OFDM technique provides the same throughput as a conventional OFDM system. However, since each data symbol is spread over the entire system bandwidth, a frequency diversity effect is realized when the signal is dispread in the receiver.

The method of the present invention extends the transmission time or reduces the transmit power in response to a partial loading condition, particularly for packet oriented systems.

The inventive method of utilizing interference averaging disclosed herein reduces the number of data symbols transmitted per OFDM symbol interval and also reduces the transmit power based on loading. For the 50% loading example, only N/2 data symbols would be transmitted per OFDM symbol interval. As a result, only 50% of the chip vectors are transmitted and the signal power per OFDM symbol period is reduced by 50%. As with the other described techniques, the transmission of N data symbols now requires two OFDM symbol periods rather than one.

The previously described subcarrier puncturing method can be combined with frequency-spread OFDM. In this situation, it is possible to transmit data on all of the chip vectors, but the chip vector length will be less than N. For the 50% loading example with puncturing, the chip vector length would be N/2, and the chips would occupy N/2 subcarriers, while nulls would occupy the remaining N/2 subcarriers.

Time-Spread OFDM

Time-Spread OFDM is a known technique that spreads a data symbol across several adjacent OFDM symbol periods on the same subcarrier. It is very similar to conventional single carrier spread spectrum—each subcarrier operates like a separate single carrier spread spectrum system. A data symbol is assigned to a subcarrier, and is then multiplied by a chip sequence. The chip duration is equivalent to the OFDM symbol period and since each subcarrier operates independently, the spreading sequence length is not constrained by the number of subcarriers. For a spreading sequence length of $N_s$, $N_s$ orthogonal spreading codes can be defined. The $N_s$ sequences can be modulated by $N_s$ data symbols and summed at the chip level prior to transmission. In this case, a single subcarrier transmits a total of $N_s$ data symbols over $N_s$ OFDM symbol intervals, so that the throughput of the time-spread OFDM system is identical to a conventional OFDM system. Since the channel is flat over the bandwidth of an OFDM subcarrier, time-spread OFDM does not suffer from inter-chip interference. In fact, code orthogonality is preserved over the channel unless the channel changes over the time duration of the spreading sequence.

The method of the present invention extends the transmission time or reduces the transmit power in response to partial loading conditions, particularly for packet oriented systems.

The method of interference averaging disclosed herein reduces the number of data symbols transmitted per sequence interval and also reduces the transmit power. For the 50% loading example, only $N_s/2$ data symbols would be used to modulated $N_s/2$ spreading codes on each subcarrier. The remaining $N_s/2$ codes are not used (or equivalently are modulated by zero). As a result, only 50% of the codes are transmitted and the signal power per OFDM symbol period is reduced by 50%. With this technique, the transmission of $N_s*N$ data symbols now requires $2N_s$ OFDM symbol periods rather than $N_s$.

Downlink Power Control with Frequency Domain Mixing of Users

Downlink power control in broadband wireless systems can provide improved coverage reliability. This can be accomplished by redistributing some of the power from users with an excess C/(I+N) to those with an insufficient C/(I+N). Circuit-oriented direct sequence CDMA systems typically implement power control by allocating a different fraction of the total transmit power to each of the continuously transmitted spreading codes. If the power allocated to each code is not changing, the transmitted signal can have a total power that does not change over time.

However, TDMA and SFH-CDMA systems typically implement power control on a slot-by-slot basis, meaning that the transmitted power is constant over a slot, but can vary from slot-to-slot. For a given long-term average power output constraint, some of the slots are transmitted with higher-than-average power and others will be transmitted with lower-than-average power. This requires the power amplifier to support a large dynamic range of short-term average power outputs. In order to make the interference appear to have a nearly constant power, coding with time interleaving can be used. The interleaving is typically done over several frames to achieve sufficient averaging, leading to a large delay. Moreover, in a packet data system, the number of bits to be transmitted to a user at a particular time may be too small to fill all of the time slots required by the interleaver span.

For OFDM, a new method is disclosed which can overcome the limitations of conventional TDMA and slow frequency hop CDMA (SFH-CDMA) systems. The new method mixes the power-controlled data streams of different users over the subcarriers of a single OFDM symbol period. One implementation of this method is to assign each user a different subset of the OFDM subcarriers. The assigned subcarriers can be approximately uniformly spaced across the entire signal bandwidth. Also, high-power subcarriers are preferably adjacent to low-power subcarriers so that the total power in a group of several adjacent subcarriers does not vary significantly over the frequency band. If the data to be transmitted to the assigned users requires multiple OFDM symbol periods, the subcarrier mapping can be changed after each OFDM symbol interval and the data can be interleaved over as many of the OFDM symbol periods as possible. Cell-specific frequency and/or time offsets can also be incorporated to help spread the interference more uniformly across the frequency band.

Figure 9:
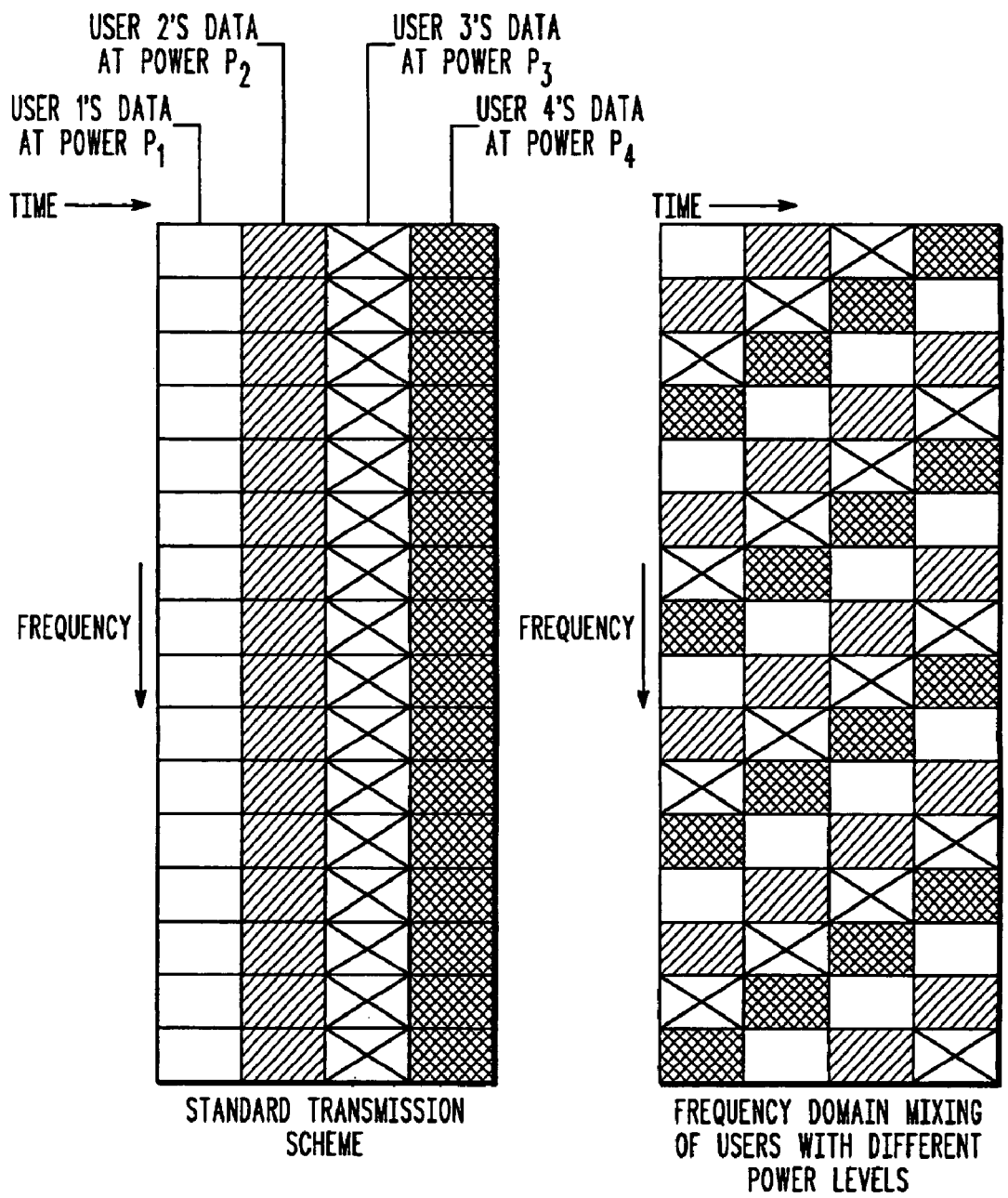
FIG. 9 is a time-frequency diagram illustrating the transmission of symbols using the prior art OFDM transmission scheme and a frequency domain scheme for mixing different power levels in accordance with the present invention.

FIG. 9 shows an example of a conventional transmission scheme with power control and a method of the invention with frequency domain mixing. With the conventional method, the short-term average power, i.e., over an OFDM symbol, can change drastically between OFDM symbols. However, with the disclosed method, the short-term average power is constant over the entire transmission.

If the system is partially loaded, this method could be combined with one or more of the previously described interference averaging schemes. For example, the power control scheme described in this section can easily be combined with frequency domain repetition or subcarrier puncturing to provide an additional level of interference averaging.

While specific embodiments of the present invention have been shown and described, it will apparent to those skilled in the art that the disclosed invention may be modified in numerous ways and may assume many embodiments other than those specifically set out and described above. Accordingly, the scope of the invention is indicated in the appended claims, and all changes that come within the meaning and range of equivalents are intended to be embraced therein.

What is claimed is:

1. A method for interference averaging, the method comprising:
    assigning a first data stream to a first subset of subcarriers for a first symbol period;
    assigning a second data stream to a second subset of subcarriers for the first symbol period, wherein the fist and second subsets have no subcarriers in common; and
    transmitting, with a transmitter, the first and second data streams simultaneously in the first symbol period, wherein the transit power of each subcarrier in the second subset of subcarriers is less than the transmit power of each subcarrier in the first subset of subcarriers.

2. The method of claim 1, further comprising:
    assigning the first data strewn to a third subset of subcarriers for a second symbol period;
    assigning the second data stream to a fourth subset of subcarriers for the second symbol period, wherein the third and forth subsets have no subcarriers in common; and
    transmitting the first and second data streams simultaneously in the second symbol period, wherein the transmit power of each subcarrier in the third subset of subcarriers is less than the transmit power of each subcarrier in the forth subset of subcarriers.

3. The method of claim 2, wherein the first data stream is interleaved over the first and second symbol periods.

4. The method of claim 2, wherein the second data stream is interleaved over the first and second symbol periods.

5. The method of claim 2, wherein the first data steam is repeated over the first and second symbol periods.

6. The method of claim 4, wherein the repeated first data stream is rotated by predetermined phase offsets.

7. The method of claim 2, wherein the combined transmit power of the first and second subsets in the first symbol period is the same as the combined transmit power of the third and fourth subsets in the second symbol period.

8. The method of claim 1, further comprising
    assigning a third data stream to a third subset of subcarriers for the first symbol period;
    wherein the first, second, and third subsets have no subcarriers in common;
    wherein the subcarrier comprising the first, second, and third subsets are interleaved over frequency; and
    transmitting the first, second, and third data streams simultaneously in the first symbol period, wherein the transmit power of each subcarrier in the third subset of subcarriers is less than the transmit power of each subcarrier in the second subset of subcarriers.

9. The method of claim 1, further comprising the step of offsetting the first symbol period by a cell-specific value for the transmission.

10. The method of claim 1, further comprising the step of offsetting the subcarriers in frequency by a cell-specific frequency offset value for the transmission.

11. The method of 1, wherein the subcarriers comprising the first and second subsets are interleaved over frequency.

12. The method of claim 1, wherein the number of subcarriers in each of the first subset of subcarriers and the second subset of subcarriers is greater than three.

13. A method for interference averaging, the method comprising
    determining whether sufficient time-frequency positions are available for transmitting data symbols of a first data stream and repeated data symbols from the first data stream; and
    based on a determination of sufficient time-frequency positions being available:
        assigning a the data symbols of the first data stream to a first set of subcarriers for a first symbol period;

assigning the repeated data symbols of the first data stream to a second set of subcarriers for a second symbol period;

transmitting, with a transmitter, the data symbols of the first data stream on the first set of subcarriers during the first symbol period; and transmitting the repeated data symbols on the second set of subcarriers during the second symbol period.

14. The method of claim 13, wherein the first and second symbol periods are coincident, and wherein the fist and second sets of subcarriers have no subcarrier in common.

15. The method of claim 13, wherein the first and second symbol periods are not coincident.

16. The method of claim 15, wherein the first and second symbol periods are adjacent symbol periods.

17. The method of claim 13, further comprising:

reducing a transmit power of the first and second sets of subcarriers in response to the assignment of repeated data symbols.

18. The method of claim 13, further comprising:

reducing a transmit power of the first and second sets of subcarriers in response to the determination that sufficient time-frequency positions are available.

19. The method of claim 13, wherein the first and second sets of subcarriers are transmitted with a power that provides a similar transmitted signal-to-nose ratio as would be obtained for a transmission of the first data stream without repeated data symbols.

20. The method of claim 13, further comprising:

offsetting the first symbol period by a cell-specific time of offset value for the transmission.

21. The mood of claim 13, further comprising:

offsetting the subcarriers in frequency by a cell-specific frequency offset value for the transmission.

22. The method of claim 13, further comprising:

rotating a repeated data symbol by a predetermined phase value.

* * * * *

UNITED STATES PATENT AND TRADEMARK OFFICE
CERTIFICATE OF CORRECTION

PATENT NO. : 7,440,509 B2 Page 1 of 1
APPLICATION NO. : 11/338564
DATED : October 21, 2008
INVENTOR(S) : Kevin Lynn Baum It is certified that error appears in the above-identified patent and that said Letters Patent is hereby corrected as shown below:

IN THE CLAIMS

In Column 9, Line 66, in Claim 1, delete "fist" and insert -- first --, therefor.

In Column 10, Line 3, in Claim 1, delete "transit" and insert -- transmit --, therefor.

In Column 10, Line 8, in Claim 2, delete "strewn" and insert -- stream --, therefor.

In Column 10, Line 24, in Claim 5, delete "steam" and insert -- stream --, therefor.

In Column 11, Line 10, in Claim 14, delete "fist" and insert -- first --, therefor.

In Column 12, Line 7, in Claim 19, delete "nose" and insert -- noise --, therefor.

In Column 12, Line 11, in Claim 20, after "time" delete "of".

In Column 12, Line 13, in Claim 21, delete "mood" and insert -- method --, therefor.

In Column 12, Line 17, in Claim 22, delete "a" and insert -- the --, therefor. (first occurrence)

Signed and Sealed this

Eleventh Day of August, 2009

David J. Kappos
*Director of the United States Patent and Trademark Office*